Dec. 25, 1923.
W. H. BAUMEISTER
ANTISKID CHAIN
Filed Jan. 22, 1923
1,478,420
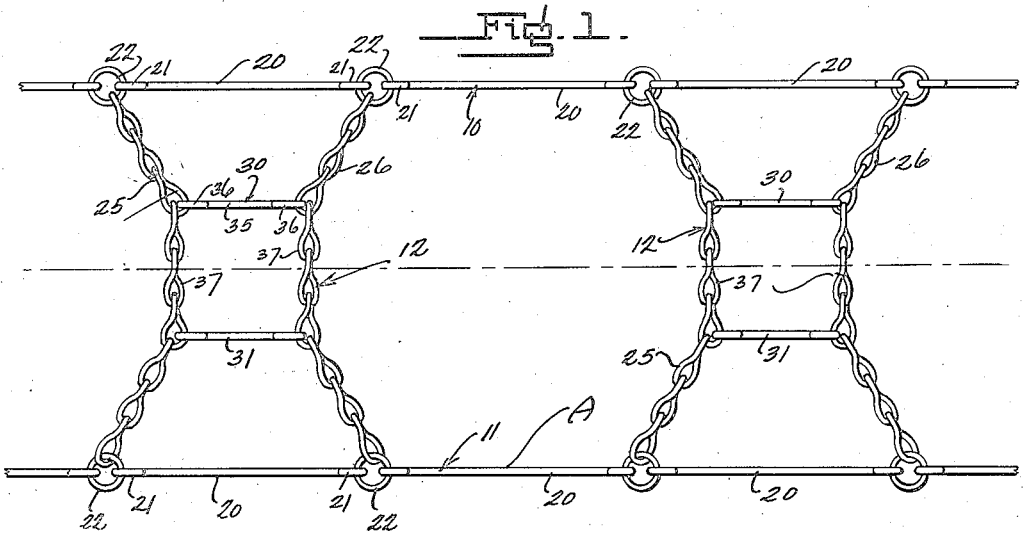
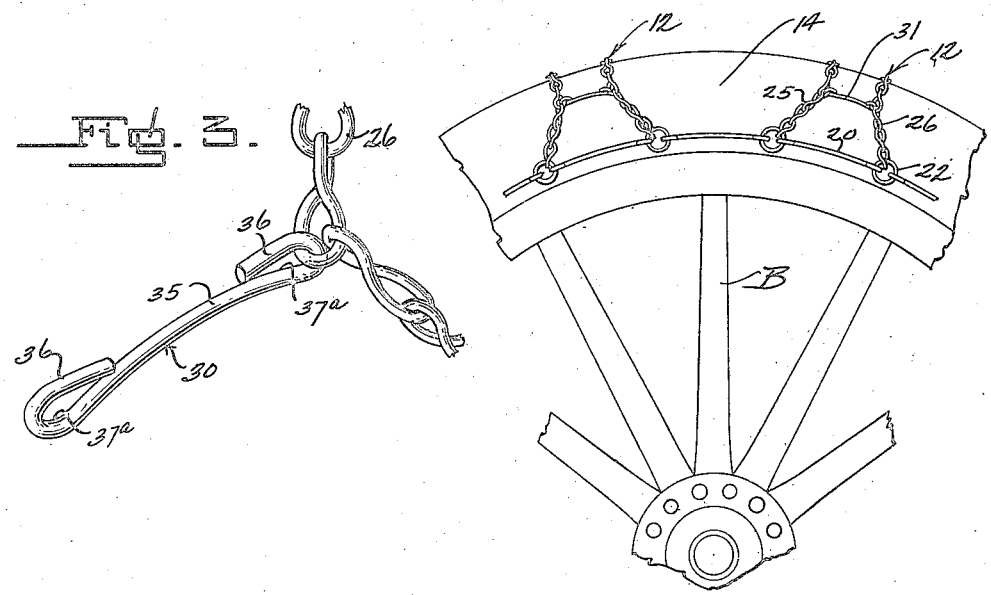
Inventor
William H. Baumeister
By Lancaster Allwine
Attorneys Patented Dec. 25, 1923.

1,478,420

UNITED STATES PATENT OFFICE.

WILLIAM H. BAUMEISTER, OF SPENCER, IOWA.

ANTISKID CHAIN.

Application filed January 22, 1923. Serial No. 614,228.

*To all whom it may concern:*

Be it known that I, WILLIAM H. BAUMEISTER, a citizen of the United States, residing at Spencer, in the county of Clay and State of Iowa, have invented certain new and useful Improvements in Antiskid Chains, of which the following is a specification.

This invention relates to improvements in anti-skid chains.

The primary object of this invention is the provision of an anti-skid chain which is relatively simple in construction and very efficient in use, giving increased traction to vehicle wheels.

An important object of the invention is the provision of an anti-skid chain which includes novel transverse assemblies so arranged as to enable the chain to assume a taut position upon the vehicle wheel, preventing undue slack in the chain, and including novel circumferential elements adjacent the crown of the tire which will prevent lateral skidding.

A further object of this invention is the provision of a tire chain embodying the above mentioned characteristics, and which is very durably constructed as to lengthen the life of the same beyond that of the ordinary tire chain.

Other objects and advantages of this invention will be apparent during the course of the following detailed description.

In the accompanying drawings, forming a part of this specification, and wherein similar reference characters designate corresponding parts throughout the several views, Figure 1 is a fragmentary plan view of a short length of the improved anti-skid tire chain, showing the novel relation of parts therein.

Figure 2 is a fragmentary side elevation of a vehicle wheel, showing a portion of the improved tire chain as used thereon.

Figure 3 is a fragmentary perspective view, showing novel associated details of this invention.

In the drawing, wherein for the purpose of illustration is shown but the preferred embodiment of this invention, the letter A generally designates the improved anti-skid chain, which may be used upon a vehicle wheel B, and includes the side lengths 10 and 11 for circumferential extension adjacent the sides of the vehicle wheel tire 14, and having novel transverse assemblies 12 for connecting the side links 10 and 11.

Referring to the side links 10 and 11, they are preferably of the same construction, and may include relatively long bar links 20, having the ends 21 thereof overturned to provide eyes; the eyes of said bar links 20 preferably being connected by the ring shaped elements 22, which turn freely in the said eyes 21. In lieu of the bar links 20, any approved arrangement of links may be used, suitable for connection of the transverse assemblies 12 thereto.

Referring to the transverse assemblies 12, they are placed in spaced relation along the lengths 10 and 11 for connecting the same. These transverse assemblies 12 are of identical construction, and but one of the same will be described. Each transverse assembly 12 preferably includes a pair of cross pieces 25 and 26, which are formed of a plurality of links as to make the same flexible; the end links of these cross pieces 25 and 26 being connected in the ring elements or members 22 of the side lengths 10 and 11. It is to be noted that the cross pieces 25 and 26 adjacent the ends thereof are connected in spaced relation on each of the side lengths 10 and 11. Intermediate their ends, and on each side of the midway point of said cross pieces 25 and 26, elongated bar links 30 and 31 may be provided for each of the transverse assemblies 12, which connect the cross pieces 25 and 26 as to dispose the bar links 30 and 31 in substantially parallel relation with respect to each other, and with respect to the side lengths 10 and 11. The bar links 30 and 31 are of identical construction, and each include a longitudinally arched body portion 35 and upturned end portions 36 doubled upon the body portion 35 to provide the oval shaped elongated eyes 37ª for receiving certain links of the cross pieces 25 and 26.

The bar links 30 and 31 are relatively shorter than the side bar links 20 of the side links 10 and 11, and intermediate the ends of the cross pieces 25 and 26, portions 37 thereof extending between the bar links 30 and 31, are disposed substantially parallel, and from which points to their connection with the rings 22, the cross pieces 25 and 26 diagonally extend in diverging relation.

When placed upon a vehicle wheel B, portions 37 of the cross pieces 25 and 26 extend across the tire 14 at the crown thereof, while the bar links 30 and 31 lie on each side of the center line of the tire 14, or on each side of the crown thereof, in the most effective location to prevent lateral skid. The anti-skid chain A having been drawn taut upon the tire 14, it is noted that the transverse assembly 12 provides substantially an H-shaped arrangement; the assemblies 12 being independent of each other, except in so far as they are connected to the side links 10 and 11.

From the foregoing description of this invention, it is apparent that an anti-skid chain has been provided, the arrangement of the various portions of which will enable a vehicle wheel to obtain the best traction upon a ground surface. The circumferential bar links 30 and 31 adapted to prevent lateral skidding are novelly placed and located so that the same will expose the center line or crown portion of the tire, yet are sufficiently placed in proximate relation to the crown of the tire as to most effectively serve to prevent lateral skid of the tire should the wheel skid either way.

Various changes in the shape, size, and arrangement of parts may be made to the form of invention herein shown and described, without departing from the spirit of the invention or the scope of the claims.

I claim:

1. An anti-skid chain comprising side pieces, flexible cross pieces, and bar links alternately connecting said cross pieces together intermediate the ends of the latter.

2. An anti-skid chain comprising side pieces, flexible cross pieces connecting said side pieces together, and a plurality of bar links of rigid formation throughout having their ends connecting said cross pieces, said bar links extending substantially parallel with the side pieces.

3. An anti-skid chain comprising side lengths, transverse assemblies connected in spaced relation to said side lengths, each of said transverse assemblies including a pair of flexible cross pieces connected intermediate their ends by relatively short bar links as to hold the intermediate portions of said cross pieces in closer relation than the end portions thereof.

4. An anti-skid chain comprising flexible side lengths, and transverse assemblies connecting said side lengths together, said transverse assemblies being arranged in spaced relation along said side lengths, and each including a pair of flexible link cross pieces, and a pair of bar links connecting said cross pieces intermediate their ends on each side of the midway points of said cross pieces, said bar links being of less dimension than the space intermediate the connecting points of said cross pieces with each side length.

WILLIAM H. BAUMEISTER.